Patented Jan. 19, 1954

2,666,791

UNITED STATES PATENT OFFICE 2,666,791

N-SUBSTITUTED AMINOPHENOLS AND AMINOPHENYL ETHERS

Viktor Weinmayr, Pitman, N. J., assignor to E. I. du Pont de Nemours & Company, Wilmington, Del., a corporation of Delaware No Drawing. Application April 20, 1951, Serial No. 222,158

15 Claims. (Cl. 260—571)

This invention relates to a process for the manufacture of N-substituted aminophenols and aminophenyl ethers having the formula:

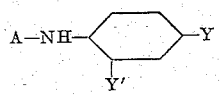

in which Y is a member of the group consisting of hydroxy and lower alkoxy radicals, Y' is a member of the group consisting of hydrogen, hydroxy, lower alkyl and lower alkoxy radicals and A is a member of the group consisting of lower alkyl, lower alkylphenyl, lower alkoxyphenyl and biphenyl radicals.

N-substituted aminophenols and aminophenyl ethers and especially hydroxy- and alkoxy- diphenylamines of this type are important technical products with many uses in the chemical field. Many processes are known for the manufacture of these products. The known processes have various technical disadvantages, such as the need for expensive starting materials, the formation of undesirable by-products, the need for considerable purification of the final product, and the requirement of numerous process steps. As N-substituted aminophenols are readily oxidized, yield and quality of product are frequently impaired during the isolation steps.

The commercial process for making 4-hydroxy-4'-methoxydiphenylamine, a typical member of the class of compounds with which this invention is concerned, illustrates the disadvantages of the known processes. This product is now made by condensing hydroquinone with p-anisidine. Both compounds and especially hydroquinone are expensive starting materials. The operation always gives a large amount of undesirable by-products, chiefly p-dianisyl-p-phenylene diamine, because the p-anisidine can and does react with both hydroxyl groups of the hydroquinone.

Bamberger reported in Annalen 390, 189 that he had prepared 4-hydroxy-4'-methyldiphenylamine by reacting p-tolylhydroxylamine with phenol in about 40% sulfuric acid. Not only does this method involve the separate and expensive preparation of the unstable p-tolylhydroxylamine but it is also difficult to separate the expected 4-hydroxy-4'-methyldiphenylamine from the mixture of undesired by-products which is obtained.

It is an object of this invention to provide a process by which substituted aminophenols and aminophenyl ethers may be made in one operation, from inexpensive materials, and by familiar and conventional chemical operations. A further object of this invention is to prepare compounds of this type in a state of high purity so that expensive and complicated purification methods are unnecessary.

I have found that aminophenols and aminophenyl ethers of the type described may be conveniently prepared by hydrogenating a mixture of a nitro compound having the formula A—NO₂, in which A is a member of the group consisting of lower alkyl, lower alkylphenyl, lower alkoxyphenyl and biphenyl radicals, and an aromatic compound having the formula:

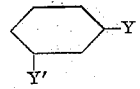

in which Y is a member of the group consisting of hydroxy and lower alkoxy radicals and Y' is a member of the group consisting of hydrogen, hydroxy, lower alkyl and lower alkoxy radicals, in the presence of a hydrogenation catalyst and an acid condensing agent from the group consisting of hydrofluoric, phosphoric, formic and oxalic acids. In a typical example of this process, 4-hydroxy-4'-methoxydiphenylamine is obtained by hydrogenating a solution of p-nitroanisole and phenol in hydrogen fluoride in the presence of a palladium hydrogenation catalyst. The product is isolated in a high degree of purity by the simple operation of filtration. The only by-product formed is p-anisidine which is easily isolated and which is itself a valuable product. Unreacted phenol may also be easily recovered.

Hydrogen fluoride is a preferred acid condensing agent and is used in many of the specific examples which follow. In order to avoid poisoning the hydrogenation catalyst the hydrogen fluoride must be free from sulfur dioxide. A suitable procedure for accomplishing this purification is shown in the following example:

*Example 1*

An iron autoclave is charged with 37 parts of technical anhydrous hydrogen fluoride analyzing about 0.7 percent sulfur dioxide as determined iodometrically. Two (2) parts of manganese dioxide are added and the charge is heated with agitation to 80° C. for eight hours. At this temperature a pressure of 98 p. s. i. is recorded. After that time the purified hydrogen fluoride is distilled into steel cylinders and is recovered with a yield of better than 95%. An analysis shows the complete absence of sulfur dioxide or any other substance that liberates iodine in the iodometric analysis. This method of purifying hydrogen fluoride is claimed in my copending application Serial No. 236,684, filed July 13, 1951.

The preparation of aminophenols and aminophenyl ethers according to the process of this invention is illustrated in the following examples in which parts are given by weight:

Example 2

A steel autoclave is charged with 2300 parts of p-nitroanisole, 1600 parts of phenol and 100 parts of palladium catalyst (3% palladium on Nuchar), and the vessel is well cooled with brine. Then 1500 parts of anhydrous technical hydrogen fluoride (purified) are added.

A pressure of 300 p. s. i. of hydrogen is applied and the charge well agitated, is heated until hydrogenation sets in at 45° C. The hydrogenation is continued at 200–300 p. s. i. of pressure until there is no further hydrogen absorption. This requires about twelve hours. The charge is then cooled to about 20° C. and the reaction mass is discharged into 8000 parts of cold water. The catalyst is removed by filtration and the clear, water-white filtrate is neutralized to pH 3.5 (weakly acid to Congo red) with about 4500 parts of 28 percent ammonia. The temperature during dilution rises to about 50° C. and the 4-hydroxy-4'-methoxydiphenylamine crystallizes out as a pale yellow solid. It is filtered at about 20° C. and is washed until the wash water is essentially acid free. The filter cake is dried at 60° C. in a vacuum drier. The yield of 4-hydroxy-4'-methoxydiphenylamine is 2200 parts, equal to 69% of theory based on p-nitroanisole. The product melts at 106–109° C. and can readily be methylated with dimethylsulfate to give 4,4'-dimethoxydiphenylamine melting from 95–97° C.

Para-anisidine corresponding to the amount of p-nitroanisole not converted to 4-hydroxy-4'-methoxydiphenylamine and unreacted phenol are recovered when the slightly acidic filtrate is made alkaline to Brilliant Yellow with ammonia.

Example 3

A steel hydrogenation bomb is cooled with Dry Ice and 75 parts of technical anhydrous hydrogen fluoride containing 0.285% sulfur dioxide are added. Potassium chlorate (0.5 part) is added and the charge is heated to 80° C. for four hours. It is then cooled and 115 parts of p-nitroanisole, 80 parts of phenol, and 5 parts of palladium catalyst are added. The hydrogenation is carried out at 40–45° C. at a pressure of 200–300 p. s. i. hydrogen and is complete in five hours. The contents of the bomb are discharged into 400 parts of cold water and the catalyst is filtered off. 4-hydroxy-4'-methoxyphenylamine is obtained upon partial neutralization with ammonia in a 66.7% yield, with a melting point of 106° C.

Example 4

Hydrogen fluoride containing 0.002% sulfur dioxide is used in this hydrogenation. A charge of 115 parts p-nitroanisole, 94 parts phenol, 121 parts of hydrogen fluoride and 5 parts of platinum catalyst (1% platinum on carbon black) is heated to 100° C. to start the hydrogenation. With a hydrogen pressure of 200–300 p. s. i. the hydrogenation requires two hours and a temperature of 100–105° C. The charge is cooled and discharged into 400 parts of cold water. The catalyst is removed in the usual manner by filtration. The dilution mass is made just barely acid to Congo red with 140 parts of 28 percent ammonia and is further diluted with water to a volume of approximately 1000 parts. One hundred parts of white 4-hydroxy-4'-methoxydiphenylamine melting at 106–107° C. are obtained. It is soluble in dilute caustic with a light brown color and shows upon shaking with air a purple discoloration and a typical disagreeable odor of the type given off by isonitriles. No 4,4'-dihydroxydiphenylamine is present because no blue solution is formed with aqueous caustic. Therefore, in spite of the relatively high reaction temperature, a demethylation does not take place. In hydrogenations at 125° C. and higher some demethylation is noted.

Example 5

A charge of 115 parts of p-nitroanisole, 74 parts of phenol, 110 parts of anhydrous hydrogen fluoride and 5 parts of platinum catalyst is hydrogenated at 800–900 p. s. i. of hydrogen pressure. The hydrogenation is finished in twenty minutes at a temperature of 40° C. The reaction mass is diluted with 300 parts of water, filtered from the catalyst, and the catalyst is washed with an additional 150 parts of water. Upon partial neutralization with ammonia and dilution with ice to about 1500 parts, 75 parts of 4-hydroxy-4'-methoxydiphenylamine melting at 108–109° C. are obtained. The slightly acidic filtrate is made alkaline to Brilliant Yellow with ammonia and 41 parts of a complex of p-anisidine and phenol was obtained.

Example 6

A charge of 115 parts of p-nitroanisole, 94 parts of phenol, 10 parts of water, 120 parts of anhydrous hydrogen fluoride, and 5 parts of palladium catalyst is hydrogenated at 45° C. and 200–300 p. s. i. hydrogen pressure. The hydrogenation is finished in about ten hours. The charge is worked up in the manner described in preceding experiments and 111 parts of 4-hydroxy-4'-methoxydiphenylamine melting at 108–109° C. are obtained. Identical results are obtained when a similar charge is hydrogenated in the presence of 80 parts of thiophene-free benzene.

Example 7

A charge of 120 parts of hydrogen fluoride, 21 parts of sodium fluoride, 115 parts of p-nitroanisole, 94 parts of phenol, and 5 parts of palladium catalyst is hydrogenated at 41–43° C. and a pressure of 200–300 p. s. i. hydrogen. The hydrogenation is complete in about 4 hours. After the usual isolation, 104 parts of 4-hydroxy-4'-methoxydiphenylamine melting at 108–109° C. are obtained.

Example 8

A charge identical with that used in Example 7 is hydrogenated at 35–40° C. A pressure of 50 p. s. i. of hydrogen is applied and allowed to drop to 0 p. s. i. each time before again being raised to 50 p. s. i. The hydrogenation is complete after about 18 hours. Upon working up in the usual manner, 103 parts of 4-hydroxy-4'-methoxydiphenylamine melting at 104° C. are obtained.

Example 9

A charge of 115 parts of p-nitroanisole, 94 parts of phenol, 100 parts of anhydrous hydrogen fluoride, 30 parts of boric acid, and 5 parts of platinum catalyst is hydrogenated at 20–25° C. at a pressure of 500–600 p. s. i. The hydrogenation is finished in ninety minutes. Upon isolaion in the usual manner 85 parts of 4-hydroxy-4'-methoxydiphenylamine are obtained.

Example 10

A slurry of 15.3 parts of p-nitroanisole, 11 parts of phenol and 0.1 part of platinum oxide in 100 parts of 20 percent phosphoric acid is hydrogenated at 20-40 p. s. i. of hydrogen at 85-90° C. Upon working up, a small amount of 4-hydroxy-4'-methoxydiphenylamine is found.

Example 11

A charge of 15 parts of p-nitroanisole, 10.4 parts of phenol, 80 parts of 85 percent phosphoric acid and 0.1 part of platinum oxide is hydrogenated at 60-70° C. and a pressure of 25-45 p. s. i. of hydrogen. The hydrogenation is complete in five hours. The finished reaction mass is diluted to 500 parts with water and filtered to remove the catalyst. The filtrate is neutralized with 32 parts of sodium hydroxide in 200 parts of water. The resulting precipitate is filtered and treated with a solution of 4 parts of sodium hydroxide in 300 parts of water. A small amount of sodium hydrosulfite is used to prevent the solution from discoloring due to oxidation. The caustic solution is filtered and then made barely acid to Congo red by adding hydrochloric acid. A white crystalline precipitate is formed (temperature 30° C.) which weighs 6.5 parts and is identified as 4-hydroxy-4'-methoxydiphenylamine, M. P. 106° C. Upon methylation with dimethylsulfate in caustic it is converted to 4,4'-dimethoxy-diphenylamine, M. P. 100° C., in a practically quantitative yield.

Example 12

The phosphoric acid used in this experiment is prepared by dissolving 105 parts of phosphorus pentoxide in 256 parts of phosphoric acid of specific gravity 1.71 (approximately 85% phosphoric acid). A charge of 135 parts of the acid thus prepared, 15 parts of p-nitroanisole, 10.4 parts of phenol, and 0.1 part of platinum oxide is hydrogenated at 70-75° C. and a pressure of 30-45 p. s. i. of hydrogen until the hydrogen absorption has stopped. The finished reaction mass is filtered to remove the catalyst and the filtrate is made just barely alkaline to Brilliant Yellow by adding 150 parts of 28 percent ammonia and ice to make a volume of about 800 parts. The precipitate which forms is dissolved in 150 parts of water containing 4 parts of sodium hydroxide and a small amount of sodium hydrosulfite to prevent discoloration of the dilution mass. The filtrate is pale yellow but turns slightly blue when exposed to the air, indicating the presence of small amount of 4,4'-dihydroxydiphenylamine formed by demethylation during the reductive condensation. The filtrate is made slightly acid to Congo red and the white precipitate which forms is filtered and dried at 85° C. The relatively low melting point of the 15 parts of 4-hydroxy-4'-methoxydiphenylamine obtained (93-95° C.) is also an indication of the presence of the above mentioned impurity. Upon methylation with dimethylsulfate in caustic, 4,4'-dimethoxydiphenylamine of a satisfactory quality is obtained.

Example 13

To a solution of 115 parts of p-nitroanisole and 85 parts of phenol in 225 parts of absolute isopropanol are added 5 parts of palladium catalyst and 115 parts of a solution of phosphorus pentoxide in 100 percent phosphoric acid (commercially known as phospholeum). The charge is heated with good agitation to 55-60° C. and hydrogen is bubbled into the reaction mass at such a rate that practically none of it passes through until the hydrogenation is fully completed. The heat of reaction causes the temperature of the charge to rise without external heating to 90° C. When the reaction is completed, the temperature falls. The reaction mass is then diluted with methanol until everything except the catalyst is in solution. After filtration most of the alcohols are evaporated on the steam bath and the residue is slurried in dilute ammonia in the presence of small amounts of sodium hydrosulfite. The precipitate is filtered and washed well to remove traces of an oily impurity. After drying, 40 parts of 4-hydroxy - 4' - methoxydiphenylamine are obtained, melting at 100-101° C.

Example 14

A charge of 120 parts of approximately 86 percent formic acid, 16 parts of p-nitroanisole, 14 parts of phenol and 1 part of palladium catalyst is hydrogenated at 45-57° C. and a pressure of 20-45 p. s. i. of hydrogen. The finished reaction mass is diluted with 200 parts of water and filtered while hot from the catalyst. Upon cooling, there precipitate 6 parts of white crystals which melt at 176-177° C. After a crystallization from 50 parts of 66 percent ethanol the product has a constant melting point of 178° C. It is soluble in aqueous sodium hydroxide and is insoluble in dilute hydrochloric acid. The color in sulfuric acid containing traces of sodium nitrite is only a very faint blue. Based on the analysis and the mixed melting point with a sample prepared by formylating authentic 4-hydroxy-4'-methoxydiphenylamine the compound is identified as N-formyl-4-hydroxy-4'-methoxydiphenylamine. This constitution is further confirmed by a caustic hydrolysis of 1 part in 12 parts of water containing 2 parts of sodium hydroxide. 4-hydroxy-4'-methoxydiphenylamine is obtained and identified by a mixed melting point with an authentic sample.

Example 15

A stainless steel autoclave is charged with 250 parts of oxalic acid containing two moles of water per mole of oxalic acid, 115 parts of p-nitroanisole, 85 parts of phenol, and 10 parts of palladium catalyst. The charge is hydrogenated in two hours at 80-100° C. and a pressure of 500-600 p. s. i. of hydrogen. The reaction mass forms a semi-solid mass of white crystals. The oxalic acid is extracted from the reaction mass by slurrying it twice with 2000 parts of water. The insoluble product is filtered and dried. One hundred sixty (160) parts of this material are obtained. This is extracted with 900 parts of ethanol. The alcoholic filtrate is concentrated to about 250 parts and upon cooling, 10 parts of a white crystalline product are obtained. This product melts at 174° C. and is believed to be an oxalate of 4-hydroxy-4'-methoxydiphenylamine. The filtrate from these crystals is evaporated and the tarry product thus obtained, which is caustic soluble, is hydrolyzed by refluxing it for 20 hours in a solution of 40 parts of sodium hydroxide in 450 parts of water. Upon acidification to slightly acid to Congo red 34 parts of 4-hydroxy-4'-methoxydiphenylamine are obtained. A sample is crystallized from dilute alcohol and is identified by analysis and mixed melting point as 4-hydroxy-4'-methoxydiphenylamine.

Example 16

A charge of 117 parts of p-nitrophenetole, 75 parts of phenol, 110 parts of hydrogen fluoride, and 5 parts of platinum on charcoal catalyst is hydrogenated at 45-50° C. and at a pressure of 300-400 p. s. i. hydrogen pressure. The hydrogenation is complete in two hours. The charge is poured into 500 parts of cold water and filtered from the catalyst. The filtrate is made barely acid to Congo red with 1000 parts of dilute caustic and 54 parts of 4-ethoxy-4'-hydroxydiphenylamine are obtained. After a crystallization from dilute methanol it melts at 83° C. It is methylated with dimethylsulfate in caustic to give 4-ethoxy-4'-methoxydiphenylamine, melting at 74° C.

Example 17

A charge of 115 parts of p-nitroanisole, 92 parts of anisole, 47 parts of boric acid and 120 parts of hydrogen fluoride and 5 parts of palladium on charcoal is hydrogenated at 50-90° C. and at a pressure of 200-300 p. s. i. of hydrogen. The finished hydrogenation mass is diluted with 500 parts of water and filtered from the catalyst. Sixty-five (65) parts of anisole which have not reacted are separated by gravity. The water layer is made barely acid to Congo red by neutralizing the excess hydrofluoric acid with 125 parts of 28 percent ammonia. The oily precipitate is dissolved in 600 parts of benzene, and the benzene solution is washed with water, dried with sodium sulfate, filtered, and distilled. An additional amount of unreacted anisole is recovered after all of the benzene is distilled off. Further distillation at 220-225° C. at a pressure of 9 mm., yields 36 parts of 4,4'-dimethoxydiphenylamine. After one crystallization it is obtained as white crystals melting at 100° C. It is identified by analysis and by a mixed melting point with an authentic sample.

Example 18

A charge of 115 parts of p-nitroanisole, 92 parts of anisole, 150 parts of hydrogen fluoride, and 5 parts of platinum catalyst is hydrogenated at 75-80° C. and a pressure of 200-300 p. s. i. of hydrogen. The hydrogenation is completed in five hours. The reaction mass is poured into 500 parts water and filtered from the catalyst. Sixty (60) parts of unreacted anisole is separated from the filtrate by gravity. The water layer is made barely acid to Congo red by neutralizing the excess of hydrofluoric acid with 140 parts of 28 percent ammonia. The reaction mass is steam-distilled to remove the last traces of unreacted anisole and 9 parts of 4,4'-dimethoxydiphenylamine are obtained, melting at 100° C. after one crystallization from ethanol.

Example 19

A charge of 122 parts of p-nitroanisole, 97 parts of m-cresol, 120 parts of anhydrous hydrogen fluoride, and 10 parts of palladium catalyst is hydrogenated at 40° C. and a pressure of 400-500 p. s. i. of hydrogen. The hydrogenation is finished in 80 minutes. The reaction mass is discharged into 350 parts of cold water and the catalyst is removed by filtration. The acidity of the pale yellow filtrate is reduced by adding 140 parts of 28 percent ammonia. The oily precipitate which forms is dissolved in benzene, and the solvent solution is washed, dried and distilled. At least 22 parts of unreacted m-cresol are recovered first. Upon further distillation there are obtained 95 parts of product boiling at 198-203° C. at 1 mm. pressure. Based on analogy, it is believed to be the 4-methoxy-4'-hydroxy-2'-methyldiphenylamine. The product melts at 89-90° C. It dissolves in sulfuric acid containing traces of sodium nitrite with a deep blue color. An analysis confirms the compound to be a methoxyhydroxymethyldiphenylamine.

Example 20

A charge of 107 parts of p-nitroanisole, 88 parts of resorcinol, 5 parts of platinum catalyst, and 110 parts of anhydrous hydrogen fluoride is hydrogenated at 20-25° C. at a pressure of 300-400 p. s. i. of hydrogen. The reaction mass is poured into 500 parts of water and the catalyst is removed by filtration. The yellow filtrate is made just barely acid to Congo red with 28 percent ammonia. One hundred (100) parts of a pale yellow solid precipitate. It shows a deep blue color in a solution of sodium nitrite in sulfuric acid. Based on the analysis, the product is probably the expected 2,4-dihydroxy-4'-methoxydiphenylamine. Upon methylation with dimethyl sulfate in aqueous caustic the corresponding trimethoxydiphenylamine is formed, distilling at 205-211° C. at a pressure of 3 mm.

Example 21

A charge of 103 parts of p-nitrotoluene, 94 parts of phenol, 117 parts of hydrogen fluoride, and 5 parts of platinum catalyst is heated without agitation to 100° C. while under a pressure of 100 p. s. i. of hydrogen. Agitation is then started and the hydrogenation is run at 100-110° C. and a pressure of 200-300 p. s. i. of hydrogen. The hydrogenation is complete in four hours and the reaction mass is poured into 500 parts of water. The catalyst is filtered off, 200 parts of ice and 180 parts of 28 percent ammonia are added to precipitate the condensation product. The precipitate is filtered, washed acid free, sucked as dry as possible, giving 110 parts of material, and at once crystallized from 200 parts of ethanol. Upon cooling, 35 parts of 4-hydroxy-4'-methyldiphenylamine are obtained, having a constant melting point of 121° C. The product forms yellow plates and is soluble with a purple color in sulfuric acid containing traces of sodium nitrite.

Example 22

A charge of 124 parts of nitroisopropylbenzene (prepared according to the procedure described in J. C. S. 1935, p. 307), 85 parts of phenol, 120 parts of hydrogen fluoride, and 5 parts of palladium catalyst is hydrogenated at 60-78° C. under a pressure of 200-300 p. s. i. The hydrogenation is complete in two hours. The reaction mass is poured into 500 parts of cold water, filtered from the catalyst, and made weakly acid to Congo red with aqueous ammonia. The precipitate which forms is dissolved in benzene and purified by distillation. Thirty-four (34) parts of isopropylaniline are obtained first. Then 80 parts of product distill from 188-210° C. at a pressure of 2 mm. This represents a mixture of 4-isopropyl-4'-hydroxydiphenylamine and an amino isopropylhydroxybiphenyl. The product forms an oil, is soluble in dilute caustic with a brown color and dissolves with a purple color in sulfuric acid containing sodium nitrite. Based on an analysis which determines the primary amines but not the secondary amines, the product contains about 50 percent of the amino isopropylhydroxybiphenyl.

Example 23

A charge of 113 parts of o-nitroethylbenzene, 85 parts of phenol, 120 parts of anhydrous hydrogen fluoride, and 5 parts of palladium catalyst is hydrogenated at 40-45° C. under a pressure of 200-300 p. s. i. The reaction is complete in ninety minutes. The reaction mass is poured into 500 parts of water and filtered from the catalyst. The filtrate is made alkaline to Brilliant Yellow with 400 parts of 28 percent ammonia and the precipitate which forms is dissolved in benzene. After washing, drying and filtering, 10 parts of a crystalline product precipitate slowly from the solution. This product melts at 150° C. and is believed to be an aminoethylhydroxybiphenyl. The benzene solution is distilled and 30 parts of ethylaniline are recovered. Sixty (60) parts of a product distill between 170-186° C. at a pressure of 1 mm. The product dissolves in sulfuric acid containing sodium nitrite with a blue color characteristic of the diphenylamine configuration. Based on the amino titer, however, the product also contains some aminoethylhydroxybiphenyl formed probably because of a rearrangement during the condensation.

Example 24

A charge of 100 parts of o-nitrobiphenyl, 72 parts of phenol, 120 parts of anhydrous hyrogen fluoride, and 5 parts of palladium catalyst is hydrogenated at 46-52° C. at a pressure of 200-300 p. s. i. The hydrogenation is complete in fifteen minutes. The reaction mass is poured into 500 parts of water and an oily reaction product is precipitated from the clear filtrate when 180 parts of 28 percent ammonia are added. The oil is washed with warm water by decantation and is then dissolved in 1000 parts of hot water containing 140 parts of sodium hydroxide. Such a strong alkalinity is needed to obtain a clear solution. Twenty (20) parts of sodium hydrosulfite are needed to maintain a light color in the solution. The caustic solution is clarified by filtration and acidified with hydrochloric acid. The precipitate is then dissolved in benzene and purified by distillation. Ortho-aminobiphenyl is obtained first, and then 54 parts of a product distilling at 225-265° C. at a pressure of 2 mm. The compound thus obtained dissolves in sulfuric acid containing traces of sodium nitrite with a blue green color, and is soluble in caustic, the caustic solution readily turning brown in the air. Based on the analysis the product is a mixture of 4-hydroxy-2'-phenyldiphenylamine and an aminohydroxyphenylbiphenyl formed through rearrangement.

Example 25

A charge of 100 parts of p-nitrobiphenyl, 81 parts of anisole, 120 parts of anhydrous hydrogen fluoride, and 5 parts of palladium catalyst is hydrogenated at 58-60° C. under a pressure of 200-300 lbs. of hydrogen. The hydrogenation is complete in 20 minutes and the reaction mass is poured into 500 parts of cold water. A precipitate forms in the dilution mass and its amount is increased when the dilution mass is made alkaline with 400 parts of 28 percent ammonia. The oil which precipitates is dissolved in benzene and purified by distillation. Forty (40) parts of anisole are recovered first and then a product amounting to 67 parts distills from 230-250° C. at a pressure of 2 mm. There is no distillation residue. This high boiling product is redistilled and some p-aminobiphenyl is recovered first. Then 49 parts of a product which distills at 224-229° C. and which resists efforts to crystallize it are obtained. It dissolves in sulfuric acid containing traces of sodium nitrite with a purple color. Based on the analysis it is believed to be the expected 4 - methoxy - 4' - phenyldiphenylamine.

Example 26

A charge of 100 parts of p-nitrobiphenyl, 72 parts of phenol, 120 parts of anhydrous hydrogen fluoride, and 5 parts of palladium catalyst is hydrogenated at 55-60° C. at a pressure of 200-300 p. s. i. The hydrogenation is complete in forty minutes. The reaction mass is poured into 500 parts of water and the dilution mass is made alkaline with ammonia. A thick paste is formed and the dilution mass is adjusted to a volume of about 3000 parts. The precipitate is filtered, washed and then dissolved in 100 parts of water containing 40 parts of sodium hydroxide. Twenty (20) parts of sodium hydrosulfite are used to prevent severe discoloration during the filtration. The filtrate is acidified at about 80° C. with hydrochloric acid. A crystalline precipitate is obtained (113 parts) which melts at about 140° C. After a crystallization from benzene it melts at 148-149° C. The product dissolves in sulfuric acid containing sodium nitrite with a cerese color and is believed to be the expected 4-hydroxy-4'-phenyldiphenylamine.

Example 27

A charge of 89 parts of phenol, 46 parts of nitromethane, 120 parts of hydrogen fluoride, and 5 parts of palladium catalyst is hydrogenated at 85-95° C. and a pressure of 500-600 p. s. i. The hydrogenation is complete in four hours and the reaction mass is poured into 500 parts of water and filtered from the catalyst. The filtrate is made alkaline with 400 parts of 28 percent ammonia and the oily precipitate is taken up in 500 parts of benzene. The benzene solution is washed, dried and distilled. Five (5) parts of N-methyl-p-aminophenol are obtained, distilling at 148-154° C. and a pressure of 8 mm. It melts at 78-82° C. After a crystallization from carbon tetrachloride it melts at 86-87° C. and is positively identified as N-methyl-p-aminophenol by a mixed melting point with an authentic sample prepared by a standard method.

Example 28

A charge of 67 parts of 1-nitropropane, 85 parts of phenol, 120 parts of hydrogen fluoride and 5 parts of palladium catalyst is hydrogenated at 80° C. and a pressure of 500-600 p. s. i. The reaction is complete in three hours. The reaction mass is poured into 600 parts of water and the dilution mass is made alkaline with ammonia. The reaction product which precipitates is dissolved in benzene, and the solution is filtered from the catalyst and dried. Upon distillation, 6 parts of a N-propyl-p-aminophenol are obtained. After a crystallization from carbon tetrachloride, it melts at 85° C.

The nitro compounds which may be employed as starting materials are those in which the nitro group is attached to a member of the group consisting of lower alkyl, lower alkylphenyl, lower alkoxyphenyl and biphenyl radicals. One useful group of nitro compounds falling within this general class are those in which the nitro compound has the formula:

in whch X is a member of the group consisting of lower alkyl, lower alkoxy and phenyl radicals. Para-nitroanisole, p-nitrophenetole, p-nitrotoluene, o-nitroethylbenzene, nitroisopropylbenzene, o-nitrobiphenyl and p-nitrobiphenyl are examples of such compounds. The members of this group in which the substituent represented by X is in the para position to the nitro group give particularly good results in this reaction. Those compounds in which the substituent is in the ortho or meta position and in which the position para to the nitro group contains hydrogen are operable but give rise to a partial rearrangement during the condensation so that a mixture of diphenylamines and substituted biphenyls is obtained.

Only a small amount of condensation takes place between the phenol and either nitrobenzene or nitronaphthalene. Para-nitrophenol does not condense but is reduced to p-aminophenol. No condensations with phenol are obtained with substituted nitronaphthalenes, with nitrobenzenes substituted with halogens, amino groups or carboxy groups, or with polynitro compounds, nitrocarbazole or nitroanthraquinones.

Useful N-substituted aminophenols and aminophenyl ethers are also obtained by condensing a phenol or phenyl ether with an aliphatic nitro compound from the group having the formula: $RNO_2$, in which R is a lower alkyl group. Examples of such compounds which have been found to react according to the process herein described are nitromethane and 1-nitropropane.

The phenols and phenyl ethers which may be used in this reaction are those having the formula:

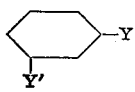

in which Y is a member of the group consisting of hydroxy and lower alkoxy radicals and Y' is a member of the group consisting of hydrogen, hydroxy, lower alkyl and lower alkoxy radicals. Examples of such compounds include phenol, resorcinol, phenyl ethers such as anisole, and meta-substituted phenols such as meta-cresol. Phenolic compounds which are not operable in this process are hydroquinone and its ether, naphthols, salicyclic acid, and hydroxyanthraquinone. No analogous condensation is obtained with benzene, alkylbenzene or chlorobenzene in place of phenol.

The nitro compounds and phenols or phenyl ethers which are most useful for this process are those in which any alkyl or alkoxy substituents contain from 1 to 4 carbon atoms.

The preferred catalysts for the reaction are palladium and platinum. These metals are commercially available as 1 to 3 percent metal on a suitable carrier such as carbon black or charcoal. The palladium or platinum catalyst may be added in the form of the oxide, in which case the free metal is formed during the hydrogenation. Palladium is particularly desirable because of its stability toward catalyst poisoning. The amount of catalyst required varies considerably depending upon the efficiency of agitation and the other conditions of hydrogenation.

The condensation reaction is carried out in the presence of an acid condensing agent from the group consisting of hydrofluoric, phosphoric, formic and oxalic acids. Hydrofluoric acid is especially desirable because it can be handled in ordinary steel equipment over a wide range of concentration without danger of corrosion. The acid condensing agent may comprise the sole solvent for the reaction mixture, or additional solvents may be employed. Thiophene-free benzene and isopropyl alcohol are suitable solvents. It is also possible to employ an excess of one of the reactants such as phenol to function as a solvent.

It is necessary that the acids and other solvents as well as the starting materials be substantially free of catalyst poisons so as not to interfere with the hydrogenation. Water is formed during the condensation reaction and it is desirable that a sufficiently large amount of acid be employed so that its concentration is not reduced to too great an extent by dilution. Using hydrogen fluoride as the condensing agent it is preferable to avoid dilution to below about 60 percent acid. Using phosphoric acid, the acid concentration may be permitted to drop to as low as 20 percent although higher concentrations are preferable. In too dilute solution, the amine salts are hydrolyzed to give the free amine which may precipitate out.

No condensation takes place when acetic acid, acetic anhydride or a mixture of mineral acid and alcohol is used in place of one of the specified condensation agents. When formic acid or oxalic acid is used, the product is obtained in the acylated form.

The hydrogenation and condensation reaction is exothermic, so that it is not necessary to supply heat after reaction has begun. In many cases the reaction proceeds at essentially room temperature. Temperatures between 10° and 125° C. are generally used. When any of the materials in the reaction mixture contain even minute traces of catalyst poisons, higher temperatures and larger amounts of catalyst are required than with pure compounds. The reaction is apparently independent of the pressure. Successful condensations have been carried out at atmospheric pressure and at pressures as high as 900 p. s. i.

By the practice of this invention, N-substituted aminophenols and aminophenyl ethers which are valuable dye intermediates are prepared simply and inexpensively by a one step process from starting materials which are themselves cheap and readily available.

I claim:

1. The process of preparing aminophenols and aminophenyl ethers having the formula:

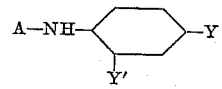

in which Y is a member of the group consisting of hydroxy and lower alkoxy radicals, Y' is a member of the group consisting of hydrogen, hydroxy, lower alkyl and lower alkoxy radicals and A is a member of the group consisting of lower alkyl, lower alkylphenyl, lower alkoxyphenyl and biphenyl radicals, which comprises hydrogenating a mixture of a nitro compound having the formula $A—NO_2$, in which A has the significance above stated, and an aromatic compound having the formula:

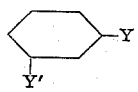

in which Y and Y' have the significance above stated, in the presence of a hydrogenation catalyst from the group consisting of palladium and platinum and an acid condensing agent from the group consisting of hydrofluoric, phosphoric, formic and oxalic acids.

2. The process of preparing 4-hydroxy-4'-methoxydiphenylamine which comprises hydrogenating a mixture of p-nitroanisole and phenol in the presence of a palladium hydrogenation catalyst and an acid condensing agent comprising hydrofluoric acid.

3. The process of preparing an N-substituted p-aminophenol in which the substituent attached to the nitrogen atom is a lower alkoxyphenyl radical which comprises hydrogenating a mixture of a ring-substituted nitrobenzene, in which the substituent is a lower alkoxy radical, and phenol in the presence of a palladium hydrogenation catalyst and an acid condensing agent comprising hydrofluoric acid.

4. The process of preparing an N-substituted p-aminophenol in which the substituent attached to the nitrogen atom is a lower p-alkoxyphenyl radical which comprises hydrogenating a mixture of a para-substituted nitrobenzene, in which the substituent is a lower alkoxy radical, and phenol in the presence of a palladium hydrogenation catalyst and an acid condensing agent comprising hydrofluoric acid.

5. The process of preparing an N-substituted p-aminophenol in which the substituent attached to the nitrogen atom is a lower alkoxyphenyl radical which comprises hydrogenating a mixture of a ring-substituted nitrobenzene, in which the substituent is a lower alkoxy radical, and phenol in the presence of a platinum hydrogenation catalyst and an acid condensing agent comprising hydrofluoric acid.

6. The process of preparing an N-substituted p-aminophenol in which the substituent attached to the nitrogen atom is a lower p-alkoxyphenyl radical which comprises hydrogenating a mixture of a para-substituted nitrobenzene, in which the substituent is a lower alkoxy radical, and phenol in the presence of a platinum hydrogenation catalyst and an acid condensing agent comprising hydrofluoric acid.

7. The process of preparing 4-hydroxy-4'-methoxydiphenylamine which comprises hydrogenating a mixture of p-nitroanisole and phenol in the presence of a platinum hydrogenation catalyst and an acid condensing agent comprising hydrofluoric acid.

8. The process of preparing an N-substituted p-aminophenol in which the substituent attached to the nitrogen atom is a lower alkylphenyl radical which comprises hydrogenating a mixture of a ring-substituted nitrobenzene, in which the substituent is a lower alkyl radical, and phenol in the presence of a palladium hydrogenation catalyst and an acid condensing agent comprising hydrofluoric acid.

9. The process of preparing an N-substituted p-aminophenol in which the substituent attached to the nitrogen atom is a lower p-alkylphenyl radical which comprises hydrogenating a mixture of a para-substituted nitrobenzene, in which the substituent is a lower alkyl radical, and phenol in the presence of a palladium hydrogenation catalyst and an acid condensing agent comprising hydrofluoric acid.

10. The process of preparing 4-isopropyl-4'-hydroxydiphenylamine which comprises hydrogenating a mixture of p-nitroisopropylbenzene and phenol in the presence of a palladium hydrogenation catalyst and an acid condensing agent comprising hydrofluoric acid.

11. The process of preparing an N-substituted p-aminophenyl lower alkyl ether in which the substituent attached to the nitrogen atom is a lower alkoxyphenyl radical which comprises hydrogenating a mixture of a ring-substituted nitrobenzene, in which the substituent is a lower alkoxy radical, and a lower alkyl phenyl ether in the presence of a palladium hydrogenation catalyst and an acid condensing agent comprising hydrofluoric acid.

12. The process of preparing an N-substituted p-aminophenyl lower alkyl ether in which the substituent attached to the nitrogen atom is a lower p-alkoxyphenyl radical which comprises hydrogenating a mixture of a para-substituted nitrobenzene, in which the substituent is a lower alkoxy radical, and a lower alkyl phenyl ether in the presence of a palladium hydrogenation catalyst and an acid condensing agent comprising hydrofluoric acid.

13. The process of preparing 4,4'-dimethoxydiphenylamine which comprises hydrogenating a mixture of p-nitroanisole and anisole in the presence of a palladium hydrogenation catalyst and an acid condensing agent comprising hydrofluoric acid.

14. The process of preparing an N-substituted p-aminophenol in which the substituent attached to the nitrogen atom is a lower alkyl radical which comprises hydrogenating a mixture of a lower nitroalkane and phenol in the presence of a palladium hydrogenation catalyst and an acid condensing agent comprising hydrofluoric acid.

15. The process of preparing N-methyl-p-aminophenol which comprises hydrogenating a mixture of nitromethane and phenol in the presence of a palladium hydrogenation catalyst and an acid condensing agent comprising hydrofluoric acid.

VIKTOR WEINMAYR.

References Cited in the file of this patent

UNITED STATES PATENTS

| Number | Name | Date |
| --- | --- | --- |
| 2,028,074 | Lauter | Jan. 14, 1936 |
| 2,041,782 | Semon | May 26, 1936 |
| 2,233,130 | Henke et al. | Feb. 25, 1941 |

FOREIGN PATENTS

| Number | Country | Date |
| --- | --- | --- |
| 75,292 | Germany | May 11, 1894 |